Jan. 27, 1959 L. A. JOHNSON ET AL 2,871,037
FLUID SEAL
Filed Jan. 27, 1956 2 Sheets-Sheet 1

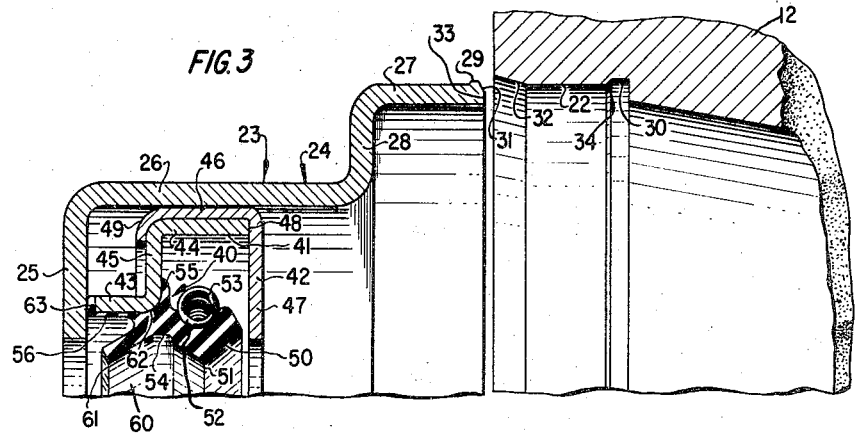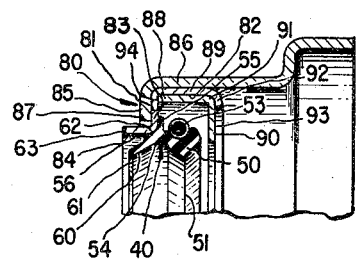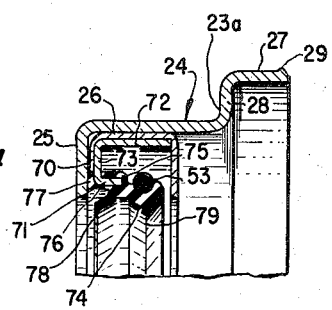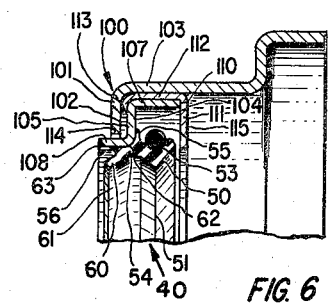

United States Patent Office 2,871,037
Patented Jan. 27, 1959

2,871,037

FLUID SEAL

Lloyd A. Johnson, Woodside, and Edward K. Bowen, Mountain View, Calif., assignors, by mesne assignments, to Federal-Mogul-Bower Bearings, Inc., Detroit, Mich., a corporation of Michigan Application January 27, 1956, Serial No. 561,774

16 Claims. (Cl. 286—5)

This invention relates to lubricant seals for use between relatively rotating members. More particularly, it relates to a lubricant seal adapted to operate satisfactorily under a substantial pressure urging said seal against one of said relatively rotating members.

The problems solved by this invention can most easily be understood by reference to a particular application of the invention, namely, a seal for use in an anti-friction bearing assembly of the type used on railroad cars. In these installations two sealing lips are advisable: a lubricant-sealing lip to keep the grease or oil inside the bearing unit, and a dust-excluding lip which serves to keep out dust, water, and other foreign matter. In some of these assemblies, the lubricant is under pressures up to about 25 pounds per square inch and urge the lubricant-sealing lip radially inwardly toward the shaft. Having relatively large pressure on a sealing lip is quite contrary to most sealing structures, in many of which no garter springs are used or else the spring exerts only a light pressure on the sealing lip. A further complication is that the dust-excluding lip cannot be under any substantial pressure, since pressure tends to deform it and (with the lubricant-resisting elastomers currently in use), tends to cold-flow it into a permanent set with portions not even touching the shaft, so that there is leakage between the shaft and the dust-sealing lip.

Thus, the problem is to have the dust-sealing lip act substantially independently from the lubricant-sealing lip, to have the dust-sealing lip under no pressure from the garter spring that acts on the lubricant-sealing lip, and to be free of the pressure of the lubricant on the lubricant-sealing lip.

Heretofore, the most satisfactory attempt to solve the problem employed a synthetic rubber sealing element of considerable thickness, with the idea that a thick body would provide sufficient rigidity to back up the lubricant-sealing lip. It was also hoped that the resultant stiffness would give with a certain amount of the needed dust-sealing lip independence. However, this has not proved fully satisfactory. Not only did the dust-sealing lip fail to achieve the desired degree of independence, but the lubricant-sealing lip itself tended to be distorted and to become molded into a permanent set.

Thus, one object of the present invention is to provide a dual lip-type of fluid seal having a dust lip that acts substantially independently from the lubricant lip.

Another object of the invention is to provide a dual-lip seal in which the resilient sealing element contains a minimum amount of synthetic rubber, the needed rigidity being supplied by a supporting metal member.

Another object of the invention is to provide a dual-lip sealing element in which the lubricant-sealing lip may be subjected to a pressure of 25 pounds per square inch without placing pressure on the dust-sealing lip and without causing the lubricant-sealing lip to be permanently distorted into a set where it fails to seal.

Another object of the invention is to provide in a dual-lip seal a gasketing action by the sealing element between an outer case element and an inner case element.

Another object of the invention is to provide a sealing structure in which the pressure of the lubricant sealed in acts to reinforce the normal action of the sealing element.

Other objects and advantages of the invention will appear from the following description of several preferred embodiments thereof, presented in accordance with 35 U. S. C. 112.

In the drawings,

Fig. 3 is an enlarged fragmentary view in section showing a portion of the seal in a position about to be assembled into a mounting bore at the end of the bearing raceway;

Fig. 4 is a view on a reduced scale of a portion of Fig. 3 showing a modified form of sealing element;

Fig. 5 is a view similar to Fig. 4 showing another modified form of sealing element; and Fig. 6 is a view similar to Fig. 4 showing a further modified form of sealing element.

Figure 1:
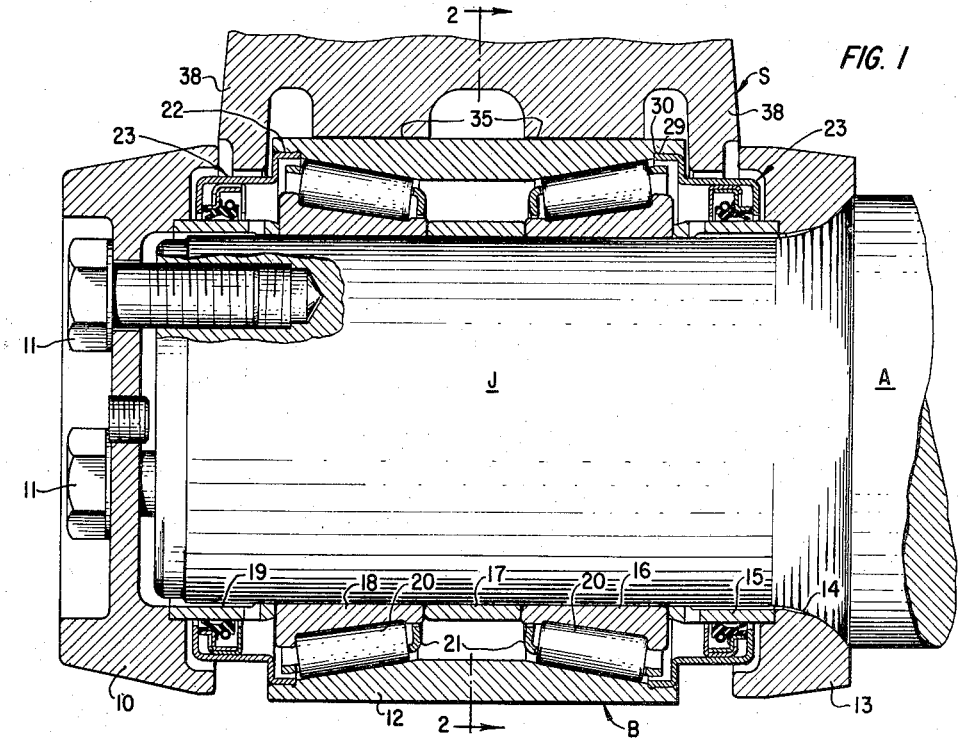
Fig. 1 is a longitudinal sectional view through a railway truck journal equipped with an anti-friction bearing assembly incorporating a seal embodying the principles of the present invention.

As herein illustrated, by way of example, the invention is incorporated in a cartridge-type tapered roller bearing assembly mounted upon a railway car truck journal. Of course, this invention is not limited to railway or roller-bearing applications, but the example will be helpful in understanding the invention. A truck axle A projects from the outer face of the truck wheel, not shown, and terminates in a trunnion-like journal J. The anti-friction bearing assembly, generally indicated at B, encloses the entire journal J and is tightly clamped thereto by means of end cap 10 and cap screws 11. Encircling the upper half of the bearing assembly B and extending downwardly along its opposite sides is a saddle S, which is interposed between the bearing assembly B and a customary pedestal side frame F (see Fig. 2) at either side of the car truck. In accordance with the standard railway truck design, a bolster interconnects the side frames at either side of the truck, and one end of the car body is supported on the mid-portion of this bolster.

The bearing assembly B comprises an outer cylindrical raceway 12 and an inner raceway comprising a plurality of rings arranged edge-to-edge along the journal J and having a press fit therewith. These rings include a rear thrust and guard ring 13, the inner rim of which has a fluid-tight fit with the rim of fillet 14 on the journal J. Arranged in order along the length of the journal J is a sealing-lip seating ring 15, a case-hardened raceway ring 16, a spacer ring 17, a second case-hardened raceway ring 18, and a second sealing-lip seating ring 19 identical with the ring 15. The end faces of each of these rings are accurately finished and abut one another so that, when the assembly screws 11 are tightened, the entire inner raceway assembly will be clamped tightly together and forced against the rim of the fillet 14 at the rear of the journal.

The inner and outer raceway rings are separated by two rings of tapered roller bearing elements 20, 20 held spaced from one another by a usual type of spacer ring 21. It will, of course, be obvious that non-tapered or cylindrical bearing elements may be employed, if desired, in which case the roller-contacting surfaces of the raceway would be parallel to the bearing axis rather than angularly disposed as required for use with tapered elements. Note that the raceway rings 12, 16, and 18 project a minimum distance beyond the outer ends of the roller elements 20, 20 in view of the high cost of the materials and the expensive processing involved in making these rings. The opposite ends of the outer raceway 12 are counterbored at 22 to provide a shouldered mounting bore for the dirt-and-lubricant sealing devices of this invention, generally indicated at 23. The counterbores 22, as well as the sealing devices 23, are preferably identical with one another in the interest of greater manufacturing economy, ease of servicing, and avoidance of misassembly of the wrong seal in the field.

Referring now to Fig. 3, it will be seen that the sealing device 23 comprises a heavy-walled cupped outer casing 24 having a radially in-turned guard flange 25 at its outer end. The sidewall of the casing 24 comprises a small diameter cylindrical (axial) section 26 joined to a larger diameter cylindrical (axial) section 27 by a radially disposed connecting web 28. The sealing lip structure constituting the subject matter of this invention is housed within the cylindrical section 26 in a plane axially offset from both the inner and outer raceways; description of its structure is deferred until completion of the description of its environment.

As described in co-pending application, Serial Number 497,697, filed March 29, 1955, a fluid-tight and positive interlocking connection between the counterbore 22 and the sealing device 23 is obtained by making the wall 27 oversize, as initially stamped, to insure an adequate layer of excess metal on its exterior. Thereafter, the outer surface of mounting rim 27 is machine-finished or formed to provide a cylindrical surface of slightly greater diameter than the sidewall of bore 22. Preferably, a narrow bead or locking detent 29 is left immediately adjacent the free rim edge. It will be seen that the thickness of metal at the bead 29 is approximately the same as that of web 28; however, the thickness of all other portions of the rim 27 is somewhat less, the difference in thickness representing the amount of material removed to insure an accurate fit with counterbore 22.

Adjacent the inner corner or shoulder of the counterbore 22 is an annular detent-receiving groove 30 for seating the detent 29 when the sealing device 23 is properly and fully seated in the counterbore 22. Both the rim edge 31 of the casing 24 and the entrance edge 32 of the counterbore 22 may be chamfered to facilitate piloting the sealing device 23 into the counterbore 22. Likewise, the trailing corner 33 of the detent 29, as well as the mating edge 34 of the receiving groove 30, may be chamfered as an aid in disengaging the detent 29 from the groove 30 for disassembly and replacement of the sealing device 23.

Since the free or leading edge of the housing rim 27 has no underlying support, it is preferable to locate bead 29 as close as possible to this edge, in order to take maximum advantage of the resiliency of the thinned cylindrical wall 27. Moreover, the bead 29 serves to reinforce and strengthen the free rim edge of the seal housing.

Figure 2:
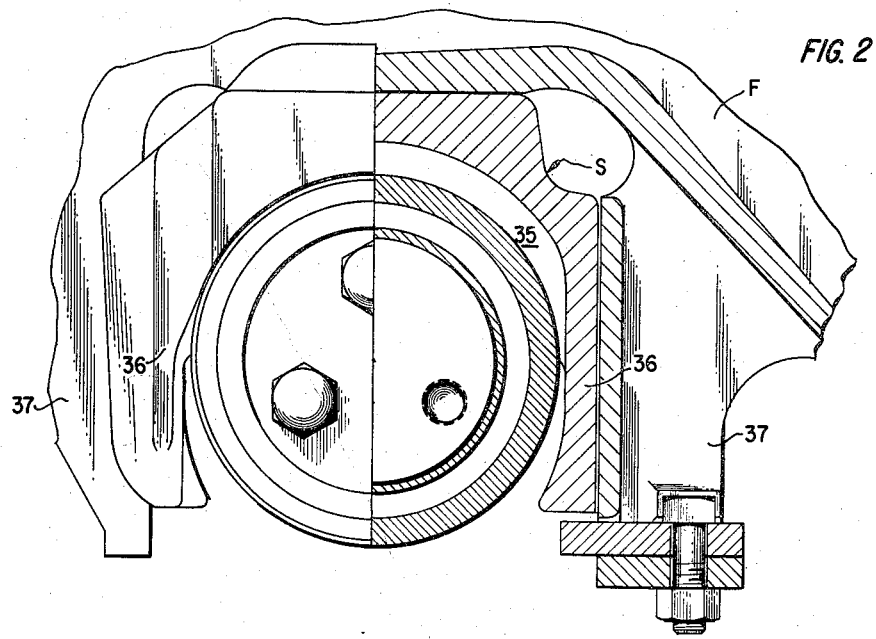
Fig. 2 is a front end view of Fig. 1, with the left half in elevation and the right half in section along the line 2—2 in Fig. 1.

From Figs. 1 and 2, it will be observed that the saddle S encircles the upper half of the raceway 12 and is supported directly thereon through large-area contact surfaces 35, 35. The opposite ends of these areas terminate in downwardly extending legs 36 and the latter, together with the saddle S proper, fit loosely between the downwardly directed retaining arms or pedestals 37, 37 of the side frame F. The saddle S also includes heavy guard flanges 38, 38 which project inwardly across the opposite ends of the raceway 12. These flanges prevent axial displacement of the saddle S with respect to the bearing B. However, as is made clear by Fig. 1, the design is such that flanges 38, 38 cannot contact any part of the seal casing 24 to distort or damage it, since the web 28 is located flush or slightly inside the rim edge of the outer raceway, while the cylindrical portion 26 is of appreciably smaller diameter than the guard flange 38.

The preceding description is necessary in order to impart an understanding of the environment and operation of the present invention. We now come to the resilient sealing element 40 itself and its relationship to the casing 24 which constitutes the invention herein. This environmental structure is substantially that set forth in and claimed in the patent application by Edward K. Bowen, Serial No. 497,679, filed March 29, 1955, now Patent No. 2,817,946.

In the present invention, the outer case element 24 houses an inner case which, in the form shown in Figs. 1 to 3, consists of two parts, an inner case element 41 and an intermediate case element 42. The inner case element 41 comprises a stepped annular member having a smaller-diameter cylindrical wall 43 and a larger diameter cylindrical wall 44 connected together by a substantially radial web 45. The intermediate case element 42 comprises an axial flange or cylindrical portion 46 and a radial flange 47. The free radial end 48 of the outer cylindrical wall 44 of the inner case element 41 abuts the inner face of the radial flange 47 of the intermediate element 42. The free radial end 49 of the axial flange 46 is then swaged over to hold the inner element 41 tightly. In the present invention, the use of the inner cylindrical inner case portion 43 is particularly important, when considered in combination with the sealing element 40.

The sealing element 40 comprises a lubricant-sealing portion 50 having a general V-shape and provided with a sharp lip 51 and a groove 52 retaining a garter spring 53. This lubricant-sealing portion 50 is connected to the inner case element 41 by a narrow connecting web or waist 54 and has a radially extending portion 55 bonded to the radially extending web 45 of the inner case element 41, as well as an axially extending portion 56 bonded to the inner periphery of the inner cylindrical portion 43 of the inner case element 41.

Branching off from or near the inboard end of this axially extending portion 56 is a dust-sealing portion 60, which is generally radially aligned with the cylindrical flange 43. By this construction, it is possible to provide for independence of the dust-sealing portion 60 and its lip 61 from the lubricant-sealing portion 50, particularly in view of the web 54 and of the location of the corner 62. After the element 40 has been installed, the lubricant inside the bearing assembly exerts pressure axially against the radial portion 55. This pressure is transmitted directly to the metal inner case member 41, thereby balancing the pressures concerned. The pressure of the spring 53 forces the lubricant lip 51 against the seating ring 19, but flexure is obtained by the deflection thereof provided in the web 54 without affecting the dust sealing portion 60 at all. At the same time, the dust sealing lip 61 is backed up by the cylindrical metal flange 43 which is closely adjacent it and therefore gives it sufficient support without sacrificing its independence.

It will be noted that the sealing element 40 is provided, adjacent its axial reinforcing-bonding portion 56, with a gasket portion 63 extending between the free end of the inner case portion 43 and the radial flange 25 of the outer casing 24. This prevents leakage between the casing elements 24, 41 and 42.

A modified form of the invention 23a is shown in Fig. 4. In this form of the invention, the inner case element 70 has, instead of the stepped shape of the case 41, an in-turned inner axial flange 71 paralleling the outer axial portion 72 to which it is connected by the radial web 73. The sealing element 74 is bonded to both sides of this in-turned flange 71 providing reinforcing portion 75 and 76 and gasket portion 77. Otherwise, the structure operates very similarly. Again, there is a gasketing action at 77 between the inner case 73 sealing lip portion and the outer case 24; again, the dust lip 78 and lubricant lip 79 are substantially independent of each other; again, the axial flange 71 backs up the dust sealing lip 78 and, again, the pressures are transmitted from the lubricant to the radial flange 73 of the inner case element 70 through a radially extending portion 75 of the sealing element 74.

Further modifications are shown in Figs. 5 and 6. In Fig. 5, the seal 80 differs from those previously described principally in two particulars; first, that the intermediate case element 81 instead of the inner case element 82 is the one that is stepped and the one to which the sealing element 40 is attached. The sealing element 40 is identical with the sealing element 40 shown in Fig. 3, only the case elements of the seal 80 being different. The radial portion 55 of the sealing element 40 is bonded to a radial web 83 of the intermediate case element 81, while the axial portion 56 is attached to the smaller diameter axial cylindrical portion 84 of the intermediate case element 81. The other elements of the sealing element have been given the same numbers as in Fig. 3 and need not be particularly described again. The outer case is, in this instance, provided with a radial flange 85, corresponding generally to but different from the flange 25 of the case 24, and an axial portion 86, corresponding generally to but shorter than the axial portion 26 of the outer case 24. The purpose of this will become apparent in a moment. It will also be noticed that in this form of the invention, the sealing element 40 projects beyond the outer case through a pierce 87 in the radial flange 85.

In the seal 80, the inner case 82 is provided with an axial cylindrical portion or flange 88 which bears snugly against the outer diameter axial cylindrical portion 89 of the intermediate case element 81. The outer periphery of the axial portion 88 is in contact throughout its length with the inner periphery of the portion 89, and the outer periphery of the element 89 is in contact substantially its entire length with the inner periphery of the outer case axial portion 86. The inner case element 82 is turned over at its inner end to provide a radial flange 90. At the corner 91 where the flanges 88 and 90 of the inner case element 82 meet, the intermediate element 81 is spun over or swaged to hold the inner case element 82 tightly by means of the portion 92.

One important reason for the structure of Fig. 5 is in connection with the removal of the seal. This is normally accomplished by inserting a tool which is passed in through the circular opening bounded by the two lips 51 and 61. The tool is then expanded so that a portion of it comes against the inner face 93 of the element 90. Then the tool is pulled (to the left, in Fig. 5) to take out the entire seal 80 from the housing. It will be noted that in the Fig. 3 device there is a considerable space between the face 25 and the face 45, and in some applications removal of the seal might tend to cause an angular deformation or cocking of the intermediate and inner case elements 42 and 41 so that the seal cannot properly be reinstalled. This problem has been solved by the structure of Fig. 5; for, when the tool is pulled against the face 93, the forces are resolved by the three parallel and snug-fitting axial flanges 88, 89 and 86, and against the flange 83 of the intermediate case element 81, and through the flange 83 and the end portion 94 of the inner case element 82, they are transmitted directly to the radial flange 85 of the outer case, instead of being transmitted only along the side walls or toe portion 63, as in the Fig. 3 device. Thus, there is no chance for cocking when the case elements are at all properly made.

The device shown in Fig. 6 is similar to that in Fig. 5, the sealing element 40 being identical. The seal 100 of Fig. 6 has an outer case 101 with a radial flange 102 like the radial flange 85, and an axial flange 103 like the axial flange 86. In this instance, the sealing element is bonded to the inner case 104, which is once again the stepped element. The inner radial web or step 105 is bonded to the radial flange 55 of the sealing element 40, and the axial flange 56 is bonded to the axial flange 108 of the inner case element 104. The outer flange or cylindrical portion 107 of the inner case 104 fits snugly into the intermediate case 110. The intermediate case 110 is provided with a radial portion 111 and an axial portion 112 which fits snugly between the axial portion 107 of the inner case 104 and the axial portion 103 of the outer case 101. The outer end of the axial portion 112 is spun over at 113 to hold the inner and intermediate cases 104 and 110 together. Again, the sealing element 40, as well as the flange 108, extend beyond the outer case 101, this time through a pierce 114. When a removal tool is inserted and expanded it bears against the face 115 of the flange 111 and transmits the forces again to the outer case 101 directly. The space between the web 105 and flange 102 is actually very small and there is no chance for any cocking due to the direct contact of the element 113 with the flange 102.

Seals made according to the present invention have received testing and have given very good results. In one such test, the seal was applied to a Timken journal box where the shaft size was 6.188" and the housing bore was 7.025". The test was run at a temperature between 190 and 205° F., and at 800 R. P. M. The grease temperature was about 140° maximum. The grease lip was 6.135" inside diameter and the dust lip was 6.142" inside diameter. The contact width of the grease lip was between .025" and .030" and that of the auxiliary lip between .010" and .020". The test was run for a total of 196 hours: 100 hours without any pressure at 24 hours a day, then 24 hours (12 on and 12 off for two periods) at 10 p. s. i., 24 hours at 15 p. s. i., 24 hours at 20 p. s. i., and 24 hours at 25 p. s. i. There was no leakage; the seal ran dry throughout and the stock condition was very good after the test was finished. There were light contact surface cracks on the grease lip and very small contact surface cracks on the auxiliary lip. Both lips were mildly round-polished and tended to be somewhat convex, but the regularity was excellent.

To the man skilled in the art, further modifications and changes of structure will occur which still lie within the spirit of this invention and within the claims set forth below.

What is claimed is:

1. In a shaft seal, the combination of a reinforcing ring having a cylindrical flange meeting a radial flange at a corner and extending axially from said corner in one direction, and a unitary resilient sealing member bonded to both said flanges around the outside of said corner and having a lubricant-sealing portion extending out away from but closely adjacent to said flanges and having a lip smaller in diameter than said ring, said sealing member also having a dust-sealing portion joined to said lubricant-sealing portion adjacent said corner by a narrow portion and having a free lip extending from adjacent said corner axially along the same direction as said cylindrical flange but also extending radially inwardly therefrom.

2. In a shaft seal, the combination of an annular metal member having a cylindrical flange with a radial flange extending radially out from one end thereof, forming an L-shaped corner with a radially and axially outer side and a radially and axially inner side, and a resilient sealing member bonded to said inner side of both said flanges along an L-shaped face and having a lubricant sealing portion extending axially away from but closely adjacent to said corner and having a radially-inwardly extending sealing lip thereby adapted to be subject to lubricant under pressure without substantial deformation, said sealing member also having a dust-sealing portion joined to said lubricant-sealing portion adjacent said corner by a narrow web and having a generally conical dust-sealing lip extending radially inwardly and axially away from said corner in the same direction as said cylindrical flange extends away from said corner, whereby said dust-sealing lip is substantially independent from pressures exerted on said lubricant-sealing lip.

3. In a shaft seal, the combination of a rigid annular member with a cylindrical axial flange and a radial flange at one end thereof, forming a corner enclosing a 90° angle between them in an outer side and a 270° angle between them on an inner side, and a resilient sealing member bonded to said inner side of both said flanges and having a lubricant sealing portion extending out axially from and spaced closely adjacent to said corner away from said flanges and having a radially-inwardly extending sealing lip and a periphery provided with a spring-receiving peripheral groove and a spring therein and adapted to be subjected to lubricant under pressure, said sealing member also having a dust-sealing portion joined to said lubricant-sealing portion adjacent said corner by a narrow waist portion and having a generally conical dust-sealing lip extending inwardly in its radial component from adjacent said corner and extending in its axial component along the direction of said cylindrical flange, whereby the dust-sealing portion is substantially supported by said axial flange and said lubricant-sealing lip is supported at a right angle thereto by said radial flange, so that said dust-sealing lip is substantially independent from pressures exerted on said lubricant-sealing lip.

4. In a shaft seal, the combination of an annular metal member having an axial cylindrical flange with a radial flange extending radially outward from the other end thereof, forming a corner with a radially and axially outer side enclosing a 90° angle and a radially and axially inner side enclosing a 270° angle, and a resilient sealing member bonded to said inner side of both said flanges around said 270° angle and covering said free end and having a lubricant sealing portion close to said corner but extending axially away from said corner and having a radially-inwardly extending sealing lip and a generally axial periphery provided with a spring-receiving peripheral groove and a spring therein and adapted by its closeness to the supporting flanges to be subject to lubricant under pressure without harmful deformation, said sealing member also having a dust-sealing portion joined to said lubricant-sealing portion adjacent said corner by a narrow web and having a generally conical dust-sealing lip free at one end and extending inwardly from adjacent said corner and toward the free end of said cylindrical flange but axially short thereof, whereby said dust-sealing lip is substantially independent from the pressures exerted on said lubricant-sealing lip and is backed up by said cylindrical flange.

5. A shaft seal including in combination an annular outer case having an axial cylindrical wall from one end of which an end wall extends radially inwardly, a reinforcing ring retained in said outer case having a radially outer and a radially inner cylindrical flange, both parallel to said axial wall and joined by a radial flange parallel to said end wall and a unitary resilient sealing member bonded to both said radial flange and said radially inner cylindrical flange and having a lubricant-sealing portion extending out beyond and away from the latest-mentioned said flanges and having a lip smaller in diameter than said ring, said sealing member also having a dust-sealing portion joined to said lubricant-sealing portion adjacent an end of said inner cylindrical flange by a narrow portion and having a free lip extending from said narrow portion along the same axial direction away from said radial flange as said inner cylindrical flange extends but extending radially inwardly therefrom, whereby said dust sealing lip is substantially independent from pressures exerted on said lubricant-sealing lip, said unitary sealing member being bonded to said ring along radial portions at both ends of said inner cylindrical flange, the portion thereof at one end abutting said case end wall to form a gasket between said ring and said case.

6. A shaft seal including in combination an outer case element having an axial cylindrical wall and a radial end wall, an intermediate case element nested in said outer case element and having an axial wall abutting said outer case axial wall, an inner case element held in said intermediate case element, one of said inner and intermediate case elements having a cylindrical flange meeting a radial flange at a corner marking the radially inner end of said radial flange, and a unitary resilient sealing member bonded to both said flanges around said corner and having a lubricant-sealing portion extending out axially from said corner away from said ring and beyond said flanges and having a lip smaller in diameter than said cylindrical flange, said sealing member also having a dust-sealing portion joined to said lubricant-sealing portion adjacent an end of said cylindrical flange by a narrow portion adjacent said corner and having a free lip extending from said narrow portion along the same axial direction away from said corner as and backed up by said cylindrical flange but extending radially inwardly therefrom, and terminating axially short of the end of said cylindrical flange, whereby said dust-sealing lip is substantially independent from pressures exerted on said lubricant-sealing lip, said sealing member covering the terminal edge of said cylindrical flange away from said corner and gasketing between said flanged element and said outer case end wall.

7. In a shaft seal, the combination of a rigid annular member with a cylindrical axial flange and a radial flange at one end thereof, forming a corner enclosing a 90° angle between them at an outer side and a 270° angle between them at an inner side, and a resilient sealing member bonded to said inner side of both said flanges and having a lubricant sealing portion spaced closely adjacent to said corner and extending out axially therefrom away from said flanges and having a radially-inwardly extending sealing lip, said sealing member also having a dust-sealing portion joined to said lubricant-sealing portion adjacent said corner by a narrow waist portion and having a generally conical dust-sealing lip extending inwardly in its radial component from adjacent said corner and extending in its axial component along the direction of said cylindrical flange, whereby the dust-sealing portion is substantially supported by said axial flange and said lubricant-sealing lip is supported at a right angle thereto by said radial flange, so that said dust-sealing lip is substantially independent from pressures exerted on said lubricant-sealing lip.

8. In a shaft seal, the combination of an annular metal member having an axial cylindrical flange with a free end and a flange extending radially outward from the other end thereof, forming a corner with a radially and axially outer side enclosing a 90° angle and a radially and axially inner side enclosing a 270° angle, and a resilient sealing member bonded to said inner side of both said flanges around said 270° angle and covering said free end and having a lubricant sealing portion close to said corner but extending axially away from said corner and having a radially-inwardly extending sealing lip, said sealing member also having a dust-sealing portion joined to said lubricant-sealing portion adjacent said corner by a narrow web and having a generally conical dust-sealing lip free at one end and extending inwardly from adjacent said corner and toward the free end of said cylindrical flange but axially short thereof, whereby said dust-sealing lip is substantially independent from the pressures exerted on said lubricant-sealing lip and is backed up by said cylindrical flange.

9. In a shaft seal, the combination of a rigid annular member with a cylindrical axial flange and a radial flange at one end thereof, forming a corner therewith and a resilient sealing member bonded to said corner and to said radial flange on the side axially opposite said axial flange and to said axial flange on the side radially opposite said radial flange and having a lubricant sealing portion spaced closely adjacent to said corner and extending out axially therefrom away from both said flanges and having a radially-inwardly extending sealing lip and adapted to be subject to lubricant under pressure, said sealing member also having a dust-sealing portion joined to said lubricant-sealing portion adjacent said corner by a narrow waist portion and having a generally conical dust-sealing lip extending inwardly in its radial component from adjacent said corner and extending in its axial component along the direction of said axial flange, whereby the dust-sealing portion is substantially supported by said axial flange and said lubricant-sealing lip is supported at a right angle thereto by said radial flange, so that said dust-sealing lip is substantially independent from pressures exerted on said lubricant-sealing lip.

10. In a shaft seal, the combination of an annular metal member having an axial cylindrical flange meeting a radial flange at a corner, said axial flange also having a free end as well as a corner end, and a resilient sealing member bonded to said axial flange from adjacent said free end to and including said corner on the side radially opposite said radial flange and having a lubricant sealing portion extending axially away from one of said free and corner ends and having a radially-inwardly extending sealing lip and adapted by its closeness to the supporting member to be subject to lubricant under pressure without harmful deformation, said sealing member also having a dust-sealing portion joined to said lubricant-sealing portion adjacent said one end by a narrow web and having a generally conical dust-sealing lip extending inwardly from adjacent said one end and toward the other said end of said cylindrical axial flange but axially short thereof, whereby said dust-sealing lip is substantially independent from the pressures exerted on said lubricant-sealing lip and is backed up by said cylindrical flange.

11. The shaft seal of claim 10 wherein said lubricant-sealing portion extends out away from said corner end of said axial flange, said narrow web lying closely adjacent said corner.

12. The shaft seal of claim 11 wherein said sealing member covers said free end of said axial flange.

13. The shaft seal of claim 10 wherein said lubricant-sealing lip extends out away from said free end of said axial flange, and said dust-sealing lip extends toward said corner in its axial direction, said narrow web lying closely adjacent said free end.

14. The shaft seal of claim 13 wherein said sealing member covers both said corner and said free end of said cylindrical flange.

15. In a shaft seal, the combination of an annular metal member having an axial cylindrical flange meeting a radial flange at a corner, said axial flange having a free end, and a resilient sealing member bonded to said axial flange for its full length from said free end to its corner end on the side radially opposite said radial flange and covering said free end and said corner end and having a lubricant sealing portion extending axially away from one of said free and corner ends and having a radially-inwardly extending sealing lip and a generally axial periphery provided with a spring-receiving peripheral groove and a spring therein and adapted by its closeness to the supporting member to be subject to lubricant under pressure without harmful deformation, said sealing member also having a dust-sealing portion joined to said lubricant-sealing portion adjacent said one end by a narrow web and having a generally conical dust-sealing lip extending inwardly from adjacent said one end and toward the other said end of said cylindrical axial flange but axially short thereof, whereby said dust-sealing lip is substantially independent from the pressures exerted on said lubricant-sealing lip and is backed up by said cylindrical flange.

16. In a shaft seal, the combination of a rigid annular member with a cylindrical axial flange and a radial flange at one end thereof, forming a corner enclosing substantially 90° between them on a first side and substantially 270° between them on a second side, and a resilient sealing member bonded to said second side of both said flanges at said corner and having a lubricant sealing lip extending out therefrom and spaced closely adjacent to said corner, said sealing member also having a dust-sealing lip joined to said lubricant-sealing lip adjacent said corner by a narrow waist portion and backed up by and substantially supported by said axial flange, so that said dust-sealing lip is substantially independent from pressures exerted on said lubricant-sealing lip.

References Cited in the file of this patent

UNITED STATES PATENTS

| | | |
|---|---|---|
| 2,676,040 | Dalton | Apr. 20, 1954 |

FOREIGN PATENTS

| | | |
|---|---|---|
| 462,687 | Great Britain | Mar. 15, 1937 |
| 578,526 | Great Britain | July 2, 1946 |
| 867,189 | Germany | Feb. 16, 1953 |